United States Patent [19]
Achelpohl

[11] Patent Number: 5,316,123
[45] Date of Patent: May 31, 1994

[54] APPARATUS FOR TURNING WORKPIECES MOVED FORWARD IN A FLAT POSITION
[75] Inventor: Fritz Achelpohl, Lengerich, Fed. Rep. of Germany
[73] Assignee: Windmoller & Holscher, Lengerich, Fed. Rep. of Germany
[21] Appl. No.: 994,750
[22] Filed: Dec. 22, 1992
[30] Foreign Application Priority Data
Dec. 23, 1991 [DE] Fed. Rep. of Germany ....... 4142824
[51] Int. Cl.⁵ ............................................. Bg5G 47/24
[52] U.S. Cl. ..................................... 198/416; 198/415
[58] Field of Search ................ 198/415, 416; 271/184, 271/230

[56] References Cited
U.S. PATENT DOCUMENTS

| 3,321,062 | 5/1967 | Brockmuller et al. | 198/415 |
| 3,432,023 | 3/1969 | Lucas | 198/416 |
| 4,720,006 | 1/1988 | Lenherr | 198/415 |
| 4,967,899 | 11/1990 | Newsome | 198/415 |
| 5,213,193 | 5/1993 | Mullins | 198/416 |

FOREIGN PATENT DOCUMENTS 1436856 11/1971 Fed. Rep. of Germany .
2304642 8/1974 Fed. Rep. of Germany .

Primary Examiner—Joseph E. Valenza
Attorney, Agent, or Firm—Keck, Mahin & Cate

[57] ABSTRACT

The invention concerns an apparatus for turning workpieces moved forward in a flat position, with a conveyor belt pair which engages and moves forward the workpiece eccentrically at one point, and a conveyor belt running parallel thereto which is shorter than the conveyor belt pair. In order to solve the problem of designing a simple apparatus of this species which is also of comparatively compact construction, provision is made according to the invention for both the conveyor belt pair and the parallel conveyor belt to be operated at the same speed, and for at least one additional transfer belt running parallel to the conveyor belt pair and the shorter conveyor belt.

10 Claims, 2 Drawing Sheets

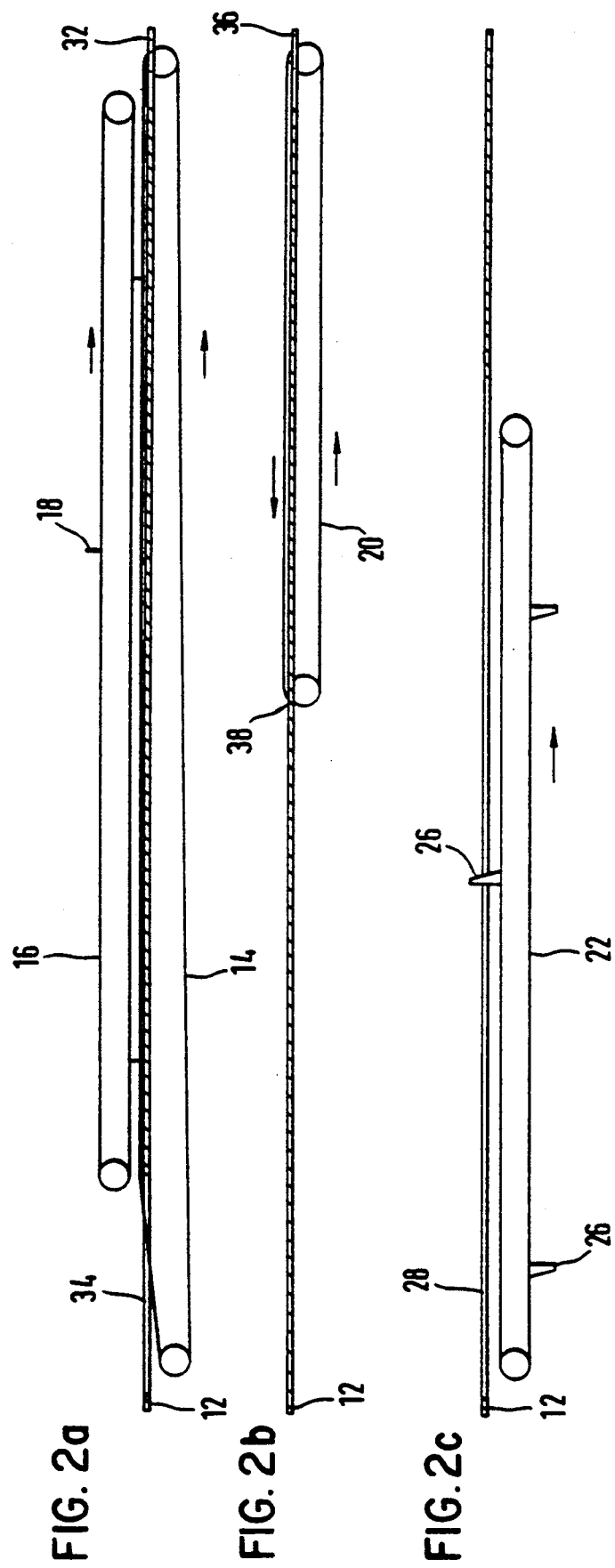

5,316,123

APPARATUS FOR TURNING WORKPIECES MOVED FORWARD IN A FLAT POSITION

FIELD OF THE INVENTION

The invention concerns an apparatus for turning workpieces moved forward in a flat position, with a conveyor belt pair which engages and moves forward the workpiece eccentrically at one point, and a conveyor belt running parallel thereto which is shorter than the conveyor belt pair.

BACKGROUND OF THE INVENTION

An apparatus for turning workpieces moved forward in a flat position is already known from German patent DE 23 04 642. In this prior art apparatus, the workpieces are engaged at their centreline parallel to the original front edge at a position near to the side edge, with the possibility of turning at this point, and then moved along by frictional lock with one bearing surface until completion of preferentially a 90° turn perpendicular to the original front edge. For this purpose, two conveying chains circulating in synchronisation are provided in a vertical plane, and these are provided with spaced, interacting clamping elements which are rotatable around axes perpendicular to the plane of motion and which serve to engage the workpieces. According to this apparatus, the workpieces are moved into position laterally and then held at the point of rotation. Because of the friction with the bearing surface of the table, the laterally protruding area of the workpiece drags behind the rotational point engaged and moved forward by the conveying chains, so that the workpiece is aligned longitudinally in the transport direction. When employing this apparatus, however, a relatively long distance has to be travelled in order to turn the workpiece moving forward in a flat position around an angle of 90°.

An apparatus of the same species is known from German patent specification DE-PS 14 36 856, in which the workpieces, of which initially the narrower side edge is conveyed as the front edge, are turned 90° such that, after passing through the apparatus, the wider edge is conveyed as the front edge. According to this prior art, the workpiece is gripped by corresponding clamping elements of conveying chains circulating one above the other in a vertical plane, and held in the vicinity of a front corner for further transport. Several conveyor belts run in parallel next to the conveying chains, each of said parallel conveyor belts exhibiting an increasingly high circulating speed as the distance from the conveying chains increases. In this way, the workpieces, which are only held between the clamping elements pivot-mounted on the conveying chains, are simultaneously rotated during the onward transport by the differential speed of the parallel conveyor belts, preferentially by 90°, so that finally the longer side edge is at the front in the direction of travel. With this prior art apparatus, each conveyor belt driven at a relative speed compared with the conveying chain pair must be operated via a correspondingly designed gear unit. Such an apparatus is not only complicated but also requires a high level of maintenance and is susceptible to malfunctioning.

The object of the present invention is to further develop an apparatus of the same species such that it exhibits a comparatively simple design and is as compact as possible.

SUMMARY OF THE INVENTION

According to the invention, this object is achieved in a further development of an apparatus of the generic species such that both the conveyor belt pair and the parallel conveyor belt are operated at the same speed, and that running parallel to the conveyor belt pair and the conveyor belt is at least one additional transfer belt. In this apparatus according to the invention, the workpiece moved forward with its narrower edge foremost is engaged eccentrically at a point in its rear section by the conveyor belt pair, and moved forward over an initial distance by this conveyor belt pair and the parallel conveyor belt operating at the same speed, without performance of any turning operation. However, as soon as the foremost end of the workpiece has reached the area of the support table in which the parallel conveyor belt ends, it is subjected to torque around its still forward-moving point of engagement as a result of friction with the support table, so that a rapid rotation of the still forward moving workpiece around this point of engagement occurs. After completion of the desired angle of rotation, for example a 90° angle, the trailing side edge of the workpiece is engaged by the transfer belt so that the workpiece can be transferred in its newly attained position to the end of the apparatus. From this functional description it is clear that the workpiece can be turned not only by an angle of 90°, but also by any other angle required. This depends solely on the position of the workpiece as it is engaged by the transfer belt.

In an improvement of the invention, clamping pins are arranged at a certain interval along the top conveyor belt for engaging the workpieces.

In a further advantageous development of the invention, the transfer belt, of which there is at least one, exhibits in predetermined intervals mechanical stops so that the transfer belt runs under the table top and the stop in each case protrudes above the surface of the table through a gap.

Two parallel running transfer belts can also be provided to good advantage.

BRIEF DESCRIPTION OF THE DRAWINGS

Further details, features and advantages of the invention are revealed in the following description of an embodiment by reference to the drawing in which.

DETAILED DESCRIPTION OF THE PREFERRED EMBODIMENTS

Figure 1:
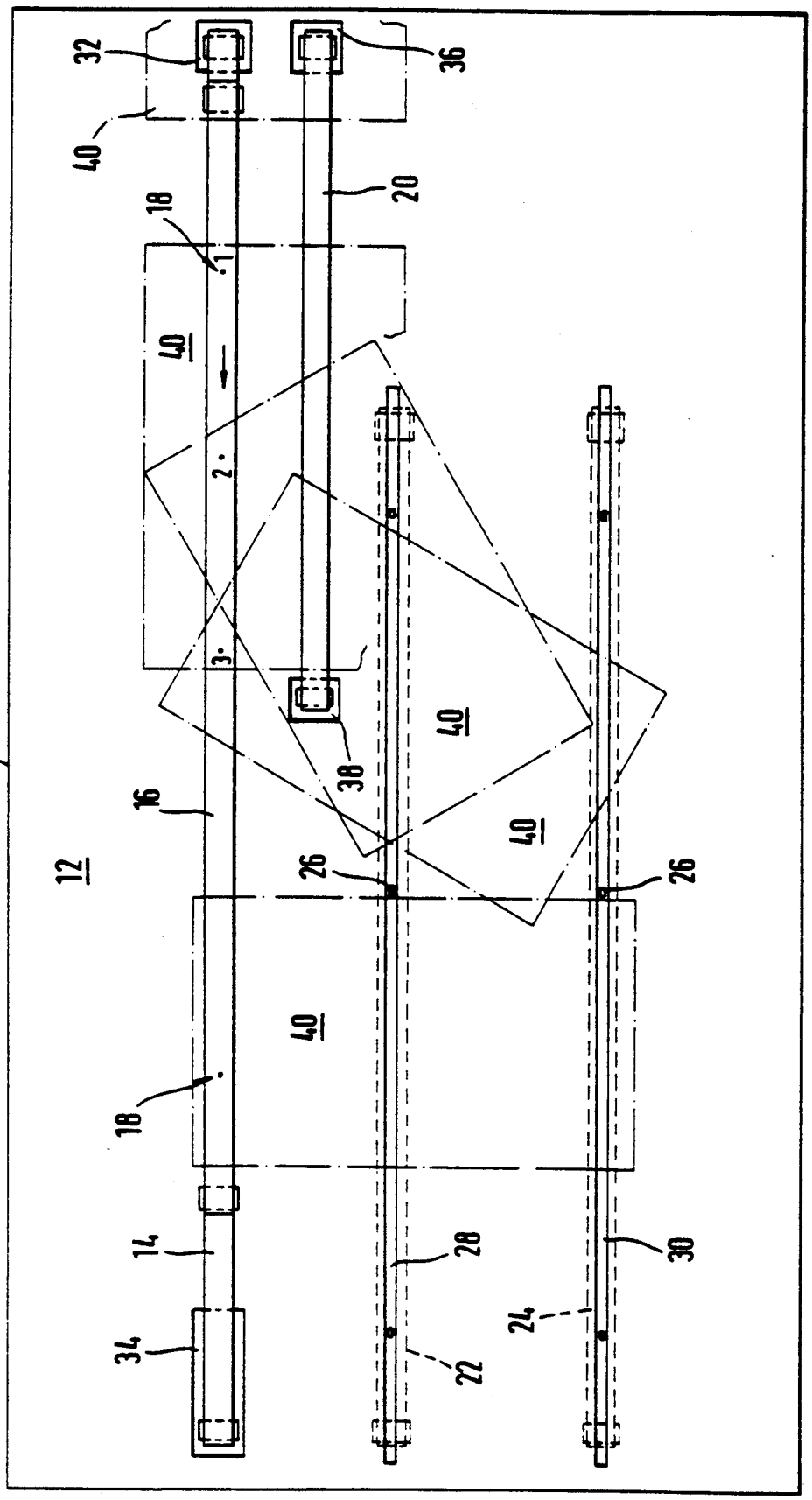
FIG. 1 shows a plan view of an embodiment of the apparatus according to the invention, and FIGS. 2a)–2c): show cross sections through the apparatus shown in FIG. 1, each in the plane of the various conveyor or transfer belts.

The apparatus 10 consists primarily of a table 12. Above the table runs an upper conveyor belt 16, and below the table 12 runs a conveyor belt 14, the upper strand of which is guided upwards above the top of the table 12 through openings 32 and 34. The pair of conveyor belts 14, 16 run at the same circumferential speed. The arrangement of the conveyor belt pair 14, 16 can be clearly seen in FIG. 2a). Several clamping pins 18 are arranged at predetermined intervals on the upper conveyor belt 16. The conveyor belt pair 14, 16 runs in the direction of the arrow shown in FIG. 2a).

Running parallel next to the conveyor belt pair 14, 16 is a comparatively short parallel conveyor belt 20 operating at the same circulatory speed. As can be seen from FIG. 1 and particularly from FIG. 2b), conveyor belt 20 also runs essentially below table 12, with the upper strand of conveyor belt 20 again being guided through openings 36 and 38 so that it runs above the surface of the table 12.

As shown in FIG. 1, two transfer belts 22 and 24 are arranged parallel to, but offset from the conveyor belt pair 14, 16 and conveyor belt 20 The transfer belts 22 and 24 begin at a point offset from the conveyor belt pair 14, 16, but end in the same area of the table 12. The transfer belts 22 and 24 run entirely below the table top. They exhibit stops 26 arranged at predetermined intervals, which protrude above the surface of the table 12 through a corresponding gap 28 and 30.

The function of the apparatus according to the invention can be explained on the basis of FIG. 1. A rectangular workpiece 40, preferably a sack workpiece, which has to be turned 90° from its longitudinal position into a transverse conveying position, is initially engaged by the conveyor belt pair 14, 16 and conveyor belt 20 running parallel thereto. Both the conveyor belt pair 14, 16 and the conveyor belt 20 running parallel thereto operate at the same circulating speed, so that the workpiece 40 is not rotated. Close to the narrower trailing side edge, the workpiece 40 is fixed eccentrically by the clamping pin 18 of the upper conveyor belt 16, thus defining a pivot point. FIG. 1 shows the first transport stage of the workpiece 40 with the workpiece 40 aligned parallel to the table edges. The pivot point in this transport situation is indicated with 1. As soon as the workpiece 40 with its leading edge runs off the shorter, parallel conveyor belt 20, friction occurs with the bearing surface of the table 12, so that a rotation is performed around the pivot point defined by the clamping pin 18. The start of rotation with the workpiece 40 moved forward in the direction of the arrow is indicated in FIG. 1, the corresponding pivot point here being designated with 2. Once the clamping pin has reached point 3, the workpiece has rotated around an even greater angle. Finally, on completion of the 90° rotation, the trailing edge of the workpiece is engaged by the two stops 26 of the transfer belts running at the same circulating speed as the conveyor belt pair 14, 16, thus preventing any further rotation of the workpiece 40. This transport situation is indicated with the workpiece 40 in FIG. 1 held in position around pivot point 4. From this functional description, however, it is also apparent that the workpiece does not necessarily have to be rotated around 90°. Rotations can also be performed in which the workpiece is turned by more than or less than 90° relative to its initial position. The corresponding desired position can be achieved in particularly simple fashion by the location of the circulating transfer belts.

What is claimed is:

1. Apparatus (10) for turning workpieces (40) moved forward in a flat position, with a conveyor belt pair (14, 16) which engages and moves forward the workpiece eccentrically at one point, and a conveyor belt (20) running parallel thereto which is shorter than the conveyor belt pair (14, 16), wherein, both the conveyor belt pair (14, 16) and the parallel conveyor belt (20) are driven at the same speed, and wherein the apparatus further comprises:

a table surface for supporting and frictionally engaging the workpiece and subjecting the workpiece to torque around a forward-moving point of engagement of the workpiece with the supporting table surface, wherein clamping pins (18) are located on the upper conveyor belt (16) at predetermined intervals for engaging a rear portion of the workpieces.

2. Apparatus as claimed in claim 1, wherein clamping pins (18) are arranged at the upper conveyor belt (16) at predetermined intervals for engaging the workpieces.

3. Apparatus as claimed in claim 1, further comprising at least one transfer belt (22, 24) running parallel to the conveyor belt pair (14, 16) and conveyor belt (20).

4. Apparatus as claimed in claim 3, wherein the at least one transfer belt (22; 24) exhibits stops (26) in predetermined intervals, such that the at least one transfer belt (22; 24) runs under a surface of a table and the stops (26) each protrude through a gap (28; 30) above the surface of the table (12).

5. Apparatus as claimed in claim 3, wherein two parallel-running transfer belts (22, 24) are provided.

6. A method for turning a workpiece being moved forward in a flat position comprising:

engaging the workpiece eccentrically at a rearward portion thereof on a conveyor belt pair and a conveyor belt running parallel thereto, which is shorter than the conveyor belt pair;

moving the workpiece forward without turning over an initial distance by the conveyor belt pair and the parallel conveyor belt operating at the same speed;

subjecting the workpiece to torque around a forward-moving point of engagement of the workpiece with a support table, and rotating the workpiece;

providing at least one transfer belt parallel to the conveyor belt pair and the parallel conveyor belt; and transferring the workpiece to the transfer belt in rotated position for further moving forward.

7. A method according to claim 6, further comprising engaging the workpieces being moved with clamping pins arranged at predetermined intervals on the upper conveyor belt.

8. A method according to claim 6, further comprising engaging the workpiece with stops on the at least one transfer belt, each said stop protruding through a gap above the surface of the support table under which the transfer belt runs.

9. A method according to claim 6, comprising engaging the workpiece with two parallel running transfer belts.

10. A method for turning a workpiece being moved forward in a flat position comprising:

engaging the workpiece eccentrically at a rearward portion thereof with a conveyor belt pair and a conveyor belt running parallel thereto, which is shorter than the conveyor belt pair;

driving the conveyor belt pair and the parallel conveyor belt at the same speed;

moving the workpiece forward without turning, said workpiece being engaged eccentrically at a rearward portion thereof by the conveyor belt pair;

providing a support table at which the conveyor belt which runs parallel to the conveyor belt pair terminates;

subjecting a forward portion of the workpiece to torque around its forward moving point of engagement with the conveyor belt pair;

rotating the workpiece around the point of engagement;

providing at least one transfer belt parallel to the conveyor belt pair and the parallel conveyor belt;

engaging a trailing side edge of the workpiece with the transfer belt;

transferring the workpiece to the transfer belt for being moved forward in rotated orientation.

* * * * *